United States Patent [19]

Shaw

[11] Patent Number: 5,167,340
[45] Date of Patent: Dec. 1, 1992

[54] FUEL CAP WITH A MOLDED SEAL

[75] Inventor: James R. Shaw, Amagansett, N.Y.

[73] Assignee: Shaw Aero Devices, Inc., Wainscott, N.Y.

[21] Appl. No.: 867,949

[22] Filed: Apr. 13, 1992

[51] Int. Cl.5 ............................................. B65D 45/00
[52] U.S. Cl. ................................. 220/295; 220/246; 220/251; 220/304; 220/DIG. 33
[58] Field of Search ............... 220/246, 251, 293, 295, 220/297, 304, DIG. 33

[56] References Cited

U.S. PATENT DOCUMENTS

| 1,346,877 | 7/1920 | Burroughs . | |
| 2,844,274 | 7/1958 | Kelish et al. | 220/246 |
| 2,969,252 | 1/1961 | Gruver . | |
| 3,216,608 | 11/1965 | McCormick | 220/295 X |
| 3,280,372 | 10/1966 | De Pew . | |
| 3,343,707 | 9/1967 | De Pew et al. | 220/246 |
| 3,391,817 | 7/1968 | Shaw . | |
| 3,912,117 | 10/1975 | Ryding | 220/293 |
| 3,921,849 | 11/1975 | Fernberg et al. | 220/295 |
| 4,189,059 | 2/1980 | Shaw | 220/246 |
| 4,416,391 | 11/1983 | Sarrazin | 220/304 |
| 4,494,673 | 1/1985 | Hiraishi | 220/288 |
| 4,497,419 | 2/1985 | Reitzel | 220/302 |
| 4,768,677 | 9/1988 | Kituskawa | 220/288 |
| 4,790,449 | 12/1988 | Kyokuichi et al. | 220/288 |
| 4,892,216 | 1/1990 | Scott | 220/206 |

Primary Examiner—Stephen Marcus
Assistant Examiner—Nova Stucker
Attorney, Agent, or Firm—Pennie & Edmonds

[57] ABSTRACT

A fuel cap is disclosed which is particularly effective in not only addressing the problem of permitting reliable relief pressure, but also in providing adequate sealing for varying environmental conditions, such as extreme pressure, temperature and swelling. The cap includes a plug member having at its lower end an elastomer sealing member integrally molded into a groove that extends around the periphery of the cap. Moreover, the sealing member is uniquely oblong shaped such that with increasing internal pressure within the tank the sealing member is deformed such as to assist in the sealing.

18 Claims, 7 Drawing Sheets

FUEL CAP WITH A MOLDED SEAL

TECHNICAL FIELD

This invention relates to fuel caps and, more particularly, to a fuel cap for permitting pressure relief without performance degradation from exposure to varying degree of pressure, temperature and swelling.

BACKGROUND OF THE INVENTION

Filler caps or fuel caps, such as for fuel tanks of airplanes, seal an adapter member which defines the opening of the tank. Typically, these caps must be constructed to meet rigid specifications and standards set forth by various governmental or regulatory agencies. For example, according to one military standard (MIL-C-38373B) by the Department of the Air Force and the Naval Air System Command, the fuel cap must be lightning safe, fuel resistant, and sufficiently resilient to be subjected to withstand a burst pressure of 100 psi for one minute without distortion or other injury.

Various fuel caps have been designed for meeting the different specifications and standards. Typically, these fuel caps are constructed with a plug member for effecting a seal with the tank opening and a cooperating locking mechanism for locking the cap onto the tank in a sealed position. Particularly, the sealing of the plug member against the annular wall of the adapter member is effected by an O-ring positioned in a groove about the periphery of the plug member. See, for example, U.S. Pat. No. 3,391,817. As the cap is lowered into the tank opening, the sealing member or O-ring is deformed into positive engagement with the annular wall of the adapter member, creating a tight circumferential seal. In some instances, however, the O-ring is deformed radially outward by the internal pressure or fuel-induced swelling, inhibiting pressure relief or decompression when the cap is unlocked.

One alternative for reliably relieving the internal pressure in the tank without interference from the sealing member is described in U.S. Pat. No. 4,189,059. This patent discloses a fuel cap comprising a plug member having an outwardly extending flange at its upper end and a lower end having a contact surface for contacting a sealing member disposed about the plug periphery, and a retaining member positioned below the sealing member for compressing the sealing member against the lower end of the plug member. The surface of the lower end of the plug member, and the upper surface of the retaining member define between them a first grooved portion for clinching the sealing member in position adjacent to the plug periphery and a second radially inwardly disposed grooved portion of reduced cross section for accommodating fuel induced swelling. Advantageously, with the clinch groove restraining radially the sealing member from outward deformation and the accommodation groove receiving the deformation radially inward, the fuel cap is able to relieve pressure without interference from the sealing member.

Further, it would also be highly desirable to have a fuel cap which can reliably relieve internal tank pressures at elevated pressures while still minimizing the deleterious effects of fuel or temperature induced swelling.

SUMMARY OF THE INVENTION

This invention relates to a new fuel cap which is particularly effective not only in permitting reliable relief pressure, but also in providing adequate sealing for varying environmental conditions, such as extreme pressure, temperature and swelling. An important aspect of the invention lies in the realization that the foregoing objectives may be achieved by utilizing a plug member which is received by the beveled annular wall of an adapter which is mounted on a fuel tank. The plug member includes a sealing member integrally molded into a first peripheral groove. The groove along the base periphery of the plug member circumscribes a portion of the sealing member. Moreover, the sealing member is uniquely oblong shaped such that with increasing internal pressure in the tank, when the plug member is engaged with the adapter, the sealing member is deformed so as to assist in the sealing.

In one exemplary embodiment of the invention, the plug member of the fuel cap is made of a polyetherimide resin having a fluorosilicone sealing member integrally molded to a first concave groove located at the base periphery of the plug member. The sealing member has an oblong shape in cross-section and a radially outwardly facing sidewall having an 8° taper in the downward radially inward direction. The tapered sidewall permits the sealing member to move more readily radially inwardly along the annular wall of the adapter in order to effectuate sealing even under severe swelling conditions. A second radially inwardly disposed peripheral groove of reduced cross section accommodates some of the deformation of the sealing member. Moreover, this second groove also affords a passage for the internal pressure to push the lower portion of the sealing member against the annular wall. Advantageously, this positive engagement aids in the sealing. The unique shape and pliant characteristics of the sealing member and the bonding strength between the sealing member and fist concave groove allow the fuel cap to function acceptably even when exposed to aromatic fuels, as well as extreme pressure and temperature.

BRIEF DESCRIPTION OF THE DRAWING

A more complete understanding of the invention may be obtained by reading the following description in conjunction with the appended drawings in which.

DETAILED DESCRIPTION

In FIGS. 1 through 4, illustrative views of an improved fuel cap 100 in accordance with the principles of the invention are shown. For convenience of reference, in the above figures like elements have been given the same reference designation. It should be noted that fuel cap 100 is illustrated within an adapter element 110 which defines a tank opening, for example, of an aircraft. It is to be understood, however, that while the fuel cap has been specifically designed to interface with this adapter element, this is for the purpose of illustration only and not for the purpose of limitation. Other suitable adapter elements for various enclosures of aromatic or non-aromatic liquids could utilize the inventive fuel cap.

Figure 1:
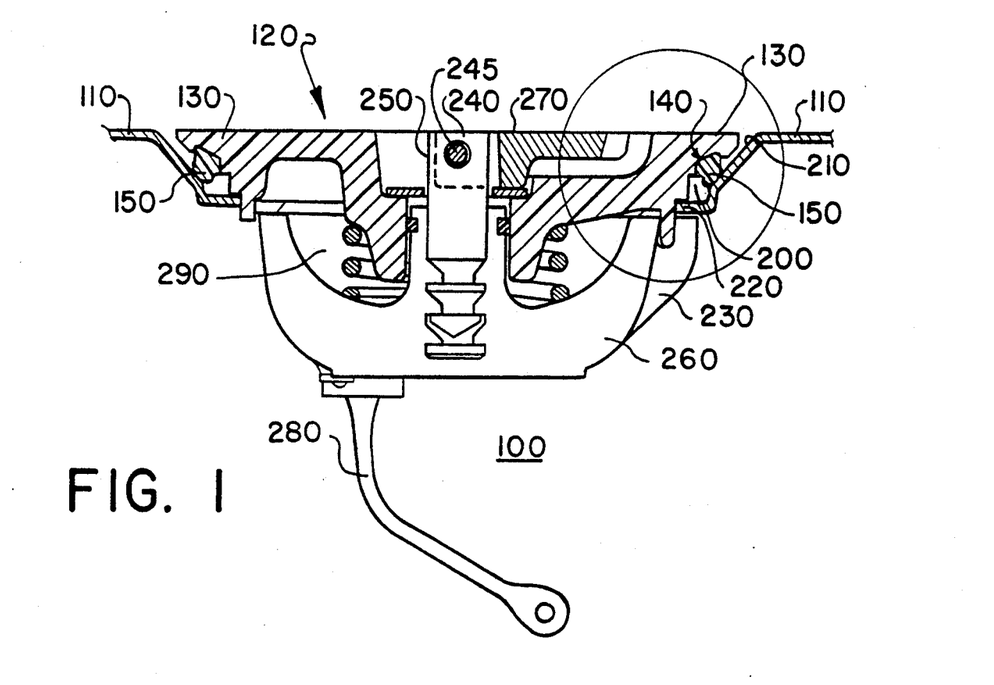
FIG. 1 is a partial cross-section view of the fuel cap in accordance with the principles of the invention.
Figure 2:
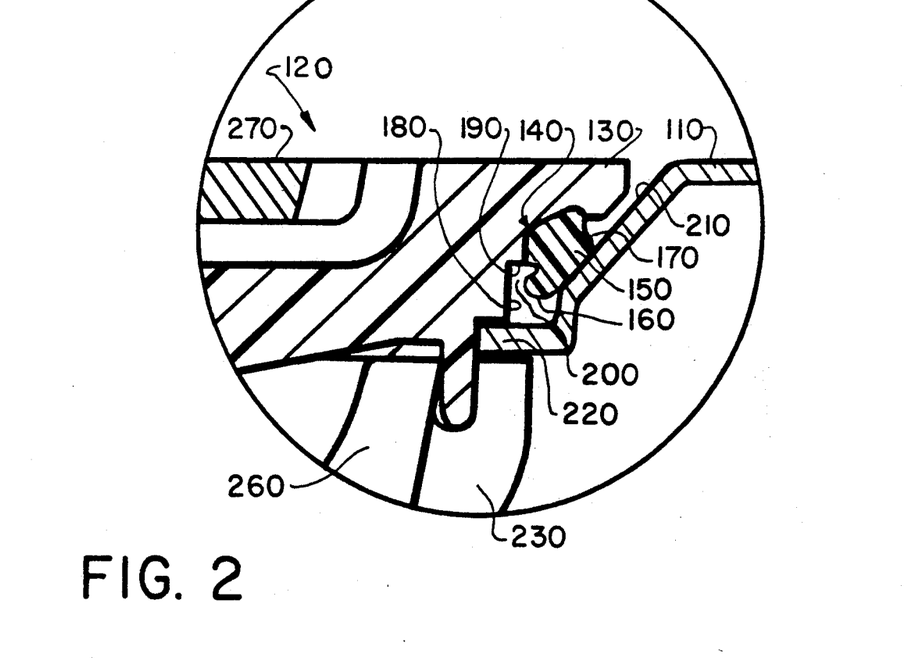
FIG. 2 is an enlarged portion of the fuel cap shown in FIG. 1, illustrating the details of the molded sealing member, plug member and adapter element.
Figure 3:
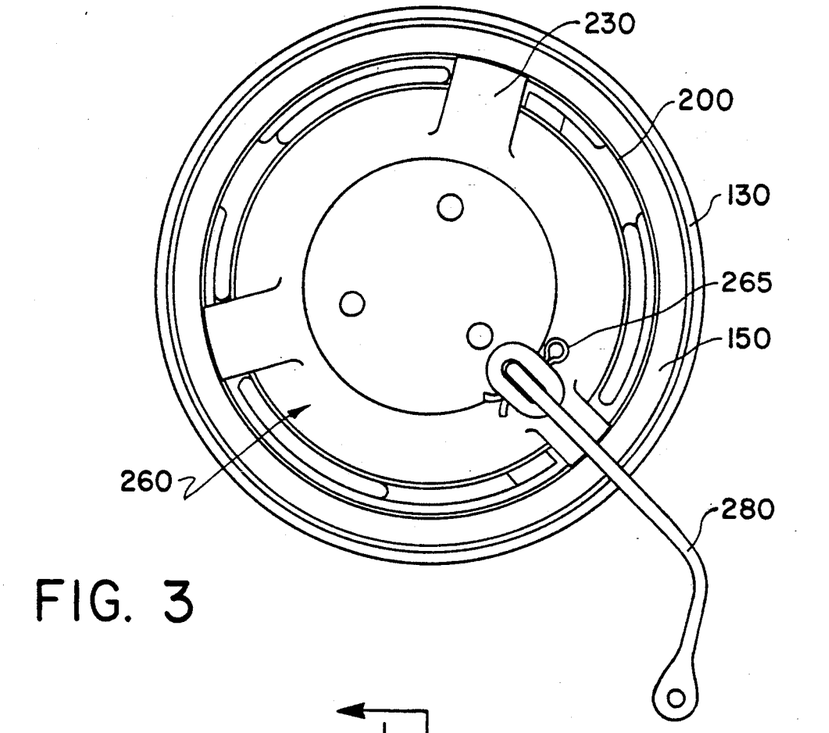
FIG. 3 is a plan view of the lower end of the fuel cap shown in FIG. 1.
Figure 4:
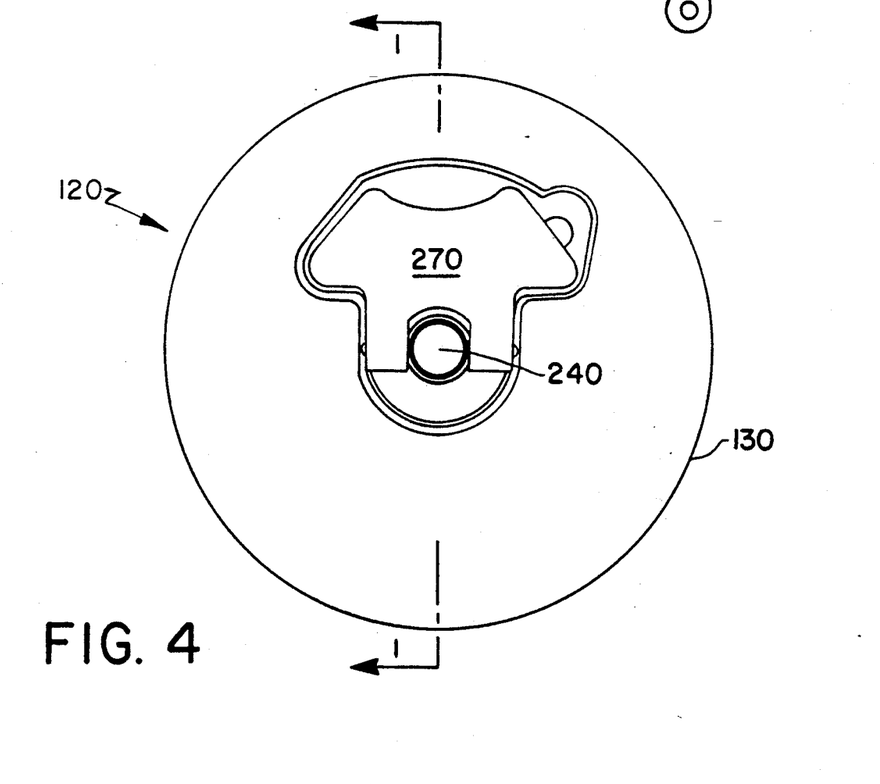
FIG. 4 is a plan view of the upper end of the fuel cap shown in FIG. 1.

Referring to FIGS. 1 and 2, fuel cap 100 comprises a plug member 120 having an outwardly extending flange 130 at its upper end and, at its side portion, a first concave groove 140 that circumscribes the entire periphery of plug member 120. A sealing member 150, such as made of a fluorosilicone elastomer, is received in concave groove 140 and bonded integrally to the groove which eliminates the necessity of a clinch groove disclosed in the prior art. By integrally bonded, it is meant that there is no apparent structural separation between sealing member 150 and concave groove 140; thus acting as a single element. Importantly, sealing member 150 is generally oblong in shape to assist in the sealing at high internal pressures. Moreover, sealing member 150 has a lower portion 160 which in cross-section has a semi-circular lower surface. The sealing member further has a downwardly and radially inwardly tapered sidewall 170 opposing concave groove 140 in the plug member. This taper is provided in order to permit sealing member 150 to move more readily inwardly along annular wall 210 of the adapter as the cap is inserted into the adapter. Tapered sidewall 170 permits sealing of the fuel cap with adapter element 110 even when sealing member 150 is swollen.

At its lower end, plug member 120 has cutout surfaces 180 and 190, defining a radially inwardly disposed second peripheral groove 200 of reduced cross section for accommodating some of the deformation of sealing member 150 due to fuel induced or temperature induced swelling. That is, groove 200 circumscribes sealing member 150 such that radially inward deformation of the sealing member may expand into the volume formed by cutout surfaces 180 and 190. Preferably, groove 200 is of sufficient cross-sectional area to accommodate the maximum fuel induced swelling of sealing member 150. Moreover, groove 200 affords a passage for the internal pressure to push lower portion 160 of the sealing member against adapter element 110, which is discussed below; thereby aiding in the sealing. With sealing member 150 integrally bonded to concave groove 140, the sealing member cannot be separated from plug member 120 and wedged between outward edge of extending flange 130 and annular wall 210 when pressure within the tank is released.

Adapter element 110 is typically constructed with a beveled annular wall 210 extending into the tank to define an opening for receiving a plug member 120 and a locking flange 220 at the bottom of annular wall 210. Typically, locking flange 220 is provided with openings or slots for permitting male protrusions of locking mechanism 230 to pass therethrough when fuel cap 100 is inserted into adapter element 110 as described in the previously mentioned patents.

The parts of the fuel cap are connected together by a shaft 240 extending through a central bore 250 of plug member 120. In order to hold the parts of the fuel cap on shaft 240, a base 260 of locking mechanism 230 is engaged to the lower end of shaft 240. An operating handle 270 is pivotally connected by a pin 245 to the upper end of shaft 240 so that the fuel cap may be installed and removed without the use of tools.

In order to prevent misplacement or loss of the cap when removed from the tank opening, it is preferably connected to the adapter element by a suitable lanyard 280. One end of the lanyard is connected through a "T" arrangement to the adapter while the other end is connected to base 260 by a pin 265. This lanyard may be constructed of polyurethane or other plastic or non-conductive materials.

Figure 8:
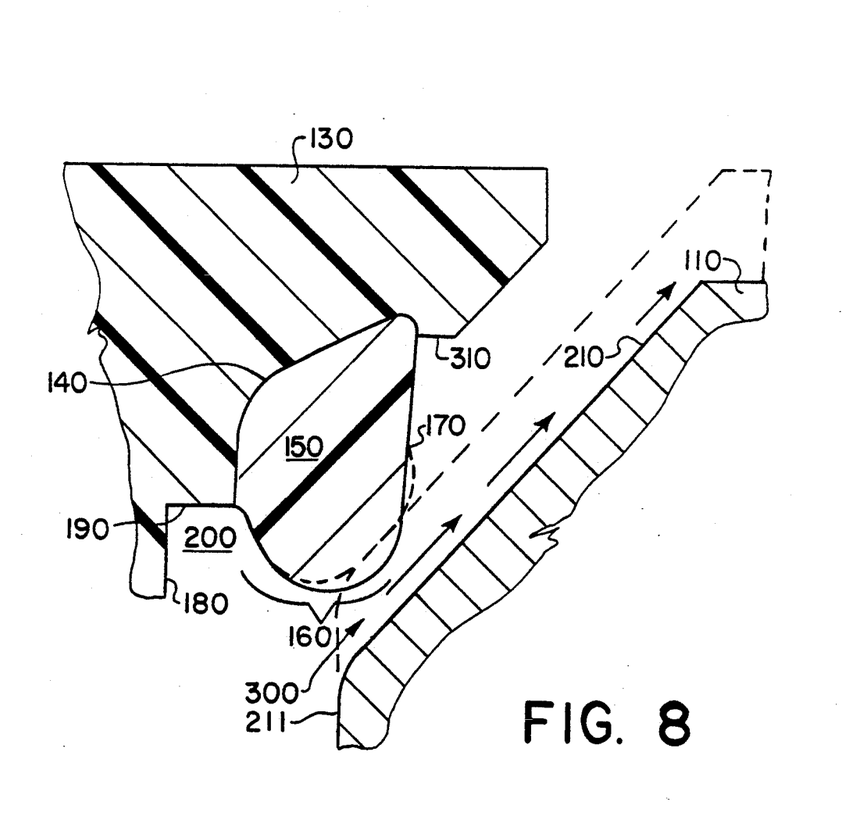
FIG. 8 is a partial cross-section view of the plug and sealing member in a "release" position.

Locking mechanism 230 may be rotated about the axis of plug member 120 and into position under locking flange 220 by turning handle 270 approximately 60°. The rotational movement of locking mechanism 230 allows it to be positioned underneath the undersurface of locking flange 220. Handle 270 which is normally in a vertical position when locking mechanism 230 is rotated is then pivoted about pin 245 into a horizontal recess of plug member 120. Urging handle 270 into the horizontal recess lifts shaft 240 upward forcing plug member 120 toward base 260 in a cam like manner which, in turn, forces sealing member 150 against annular wall 210 of adapter element 110. Moreover, locking mechanism 230 is forced to engage the undersurface of locking flange 220, locking fuel cap 100 in a "sealed" position within the tank opening. To remove the cap from the adapter, handle 270 is first pivoted to its vertical position. In this position, the cap is locked against vertical upward movement and removal from the adapter, but is not in full pressure engagement against the adapter. This position which is shown in FIG. 8 is a "release" position where internal pressure of the tank can be released. In the "release" position, locking mechanism 230 is disengaged from the undersurface of locking flange 220. After relieving internal pressure, the cap 100 may then be removed from the tank opening by rotating handle 270 approximately 60° about its axis in a counter-clockwise manner to align the slots in flange 220 with male protrusions of locking mechanism 230. Further, a compression spring 290 advantageously encircles shaft 240 so as to normally urge plug member 120 away from base 260.

Sealing member 150 is bonded to concave groove 140 by a molded insert process. This process bonds sealing member 150 to concave groove 140 of plug member 120 as the sealing member is taking shape in the mold. More specifically, a mold is formed in which a molding cavity is defined by concave groove 140 of the fuel cap and a metallic die having an interior surface that is the same as the desired outer surface of sealing member 150. The metallic die and plug member 120 are raised to the molten temperature of the sealing member. The material of sealing member 150 is then injected in liquid form into the cavity at pressures of over 5,000 psi. A special adhesive allows the seal to stick to concave groove 140 at the high temperature of the liquid state of sealing member 150. Sealing member 150 and plug member 120 are then placed in the oven at a temperature of approximately 400° F. for four hours to allow sealing member 150 to cure.

Importantly, the above molded insert process bonds sealing member 150 to concave groove 140 such that the bond is as strong as the material of the sealing member. Under extreme relief pressures (>40 psi), this strong bond prevents the sealing member from detaching from concave groove 140 or rupturing into several pieces. The contact surface between concave groove 140 and sealing member 150 is of sufficient area to provide the necessary bonding strength for the desired application.

The distinctive features of fuel cap 100 that allow the cap to be exposed to varying environmental conditions, such as extreme high internal pressures and temperatures, will be described with reference to FIGS. 5-13. Specifically, the unique shape of sealing element 150 allows swelling to be accommodated by groove 200 in addition to aiding the sealing under high pressure.

Figure 5:
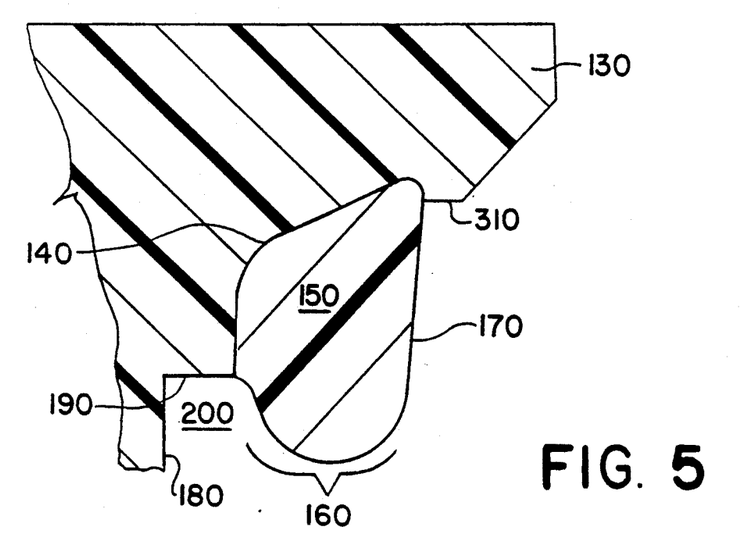
FIG. 5 is a partial cross-section view of the plug member and a nominal unswollen sealing member isolated from the adapter element.
Figure 6:
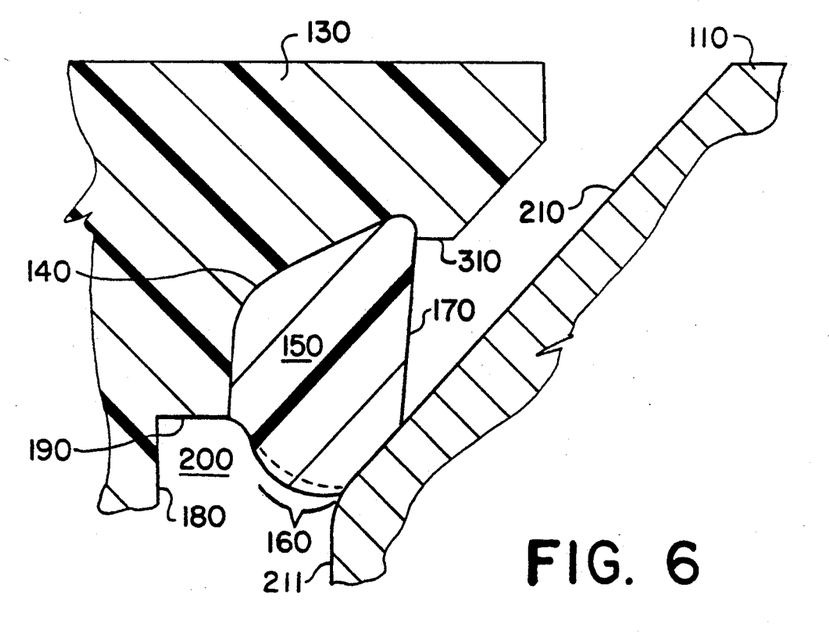
FIG. 6 is a partial cross-section view of the plug and sealing member engaging the annular wall of the adapter element in a "sealed" position and when under low or no pressure.

Turning to FIG. 5, there is shown a partial cross-sectional enlarged view of plug member 120 and sealing member 150 isolated from adapter element 110. The lower portion 160 of sealing member 150 extends vertically below cutout surface 190. In cross-section, lower portion 160 includes a semicircular downwardly extending surface facing and capable of being deformed against annular wall 210 when the fuel cap is in its "sealed" position, as shown in FIG. 6. Sidewall 170 is tapered at an angle θ in the downward radially inward direction. When fuel cap 100 is inserted against the compression of sealing member 150 and in a sealing relationship with adapter element 110 as shown in FIG. 6, sealing member 150 engages annular wall 210 and is distorted into the shape shown therein. For low internal pressures, the compression between sealing member 150 and annular wall 210 that results from plug member 120 being urged toward adapter element 110 during locking is sufficient to effectuate sealing. For low pressures (approximately less than 10 psi), sealing member 150 distorts, with a slight bulge directed inwardly from annular wall 210 and a substantially flat surface against annular wall 210.

Figure 7:
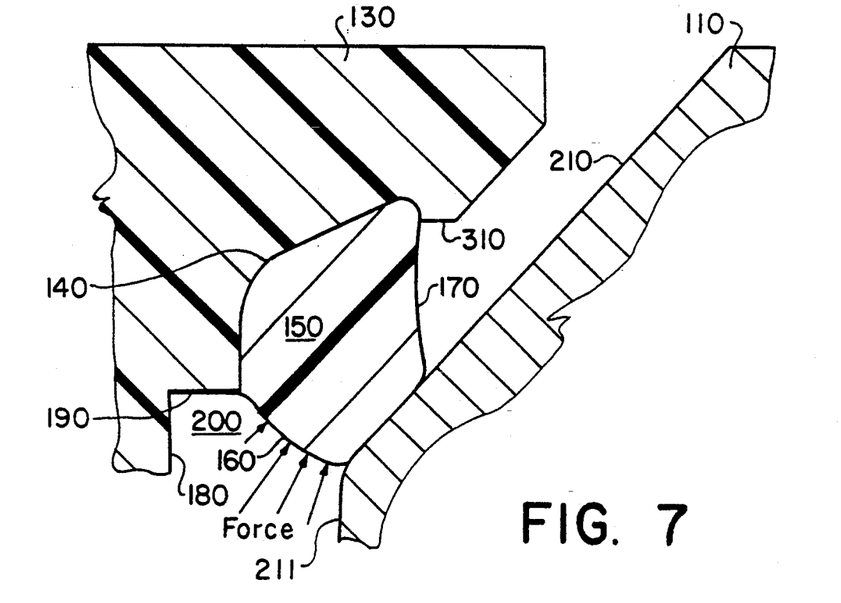
FIG. 7 is a partial cross-section view of the plug and sealing member in a "sealed" position and under a high internal pressure.

FIG. 7 illustrates fuel cap 100 in a "sealed position" and under a high internal pressure (approximately 100 psi). The resulting applied force due to the pressure is indicated by arrows and acts against the inner surface of lower portion 160. Importantly, groove 200 affords a passage for the applied pressure to push sealing member 150 against annular wall 210, thereby creating a tighter circumferential seal therebetween with respect to a low pressure condition. This can be understood by observing from FIG. 7 that under high pressure, for the particular shape of sealing member 150, some material at the inward surface of lower portion 160 is forced outwardly toward sidewall 170. This causes a radial outward movement of surface 170 and thereby increases the engagement of the sealing member against annular wall 210.

Under high pressure, fuel cap 100 may slightly deflect upward due to the applied force from the internal pressure. The pliant characteristics of sealing member 150 prevent any leakage. Advantageously, the utilization of an integral base and sealing member provides sufficient strength and resilience to retain the sealing member in concave groove 140 such that the force exerted by the internal pressure does not force the sealing member out of the groove.

Lifting handle 270 into the "release" position results in an upward movement of plug member 120 resulting from the effects of the confined tank pressure. This upward movement disengages sealing member 150 from annular wall 210. As illustrated in FIG. 8, this "release" position provides a clearance 300 defining an air passage between sealing member 150 and annular wall 210 to permit adequate pressure relief. For comparison purposes, the relation between plug member 120 and annular wall 210 in the "sealed" position is indicated by dash lines.

If sealing member 150 is exposed to aromatic fuels or extreme high and low temperatures, it is important that any induced swelling or contraction be appropriately accommodated by the clearance between annular wall 210 and sealing member 150 so as not to interfere with the proper performance of the seal. With the present invention, this is accomplished by constructing fuel cap 100 such that in its "release" position the clearance 300 between annular wall 210 and sealing member 150 is greater than the swelling of sealing member 150.

Figure 9:
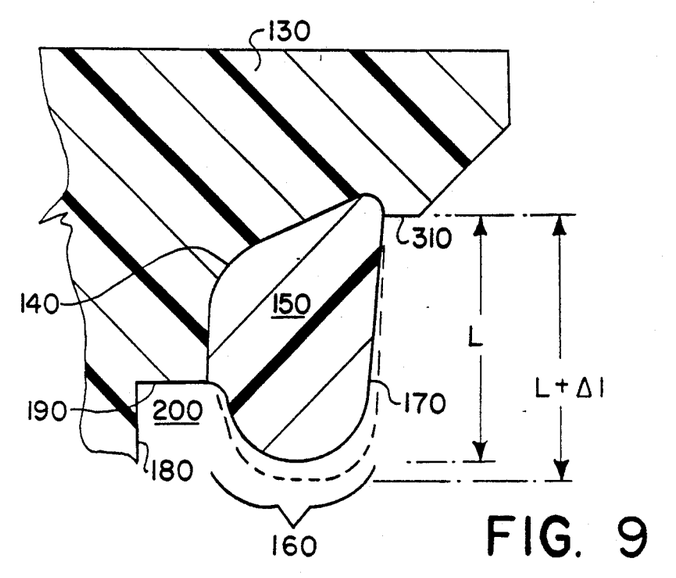
FIG. 9 is a partial cross-section view of the sealing member illustrating fuel or temperature induced swelling.

To better understand how the unique shape of sealing member 150 and inwardly disposed groove 200 accommodate the effects of swelling and contraction, it is advantageous to examine the physical deformation of sealing member 150 under swelling or contraction conditions for varying environmental conditions, e.g., low and high temperatures, and low and high pressures. As illustrated in FIG. 9, any swelling (indicated by dash lines), whether fuel or temperature induced, is transformed into a substantially linear downward swell because concave groove 140 prevents expansion radially inward and has the effect of limiting expansion radially outwardly. Typically, during swelling, sealing member 150 expands vertically downwardly from a length L to a length $L+\Delta 1$, with the nominal radius of curvature of lower portion 160 slightly increasing. It is important to realize that when the fuel cap is in a "sealed" position, sealing member 150 will deform to a different shape and have a different surface contact area on annular wall 210. Swelling normally enlarges this surface contact area to the annular wall so as to enhance the seal therebetween.

Figure 10:
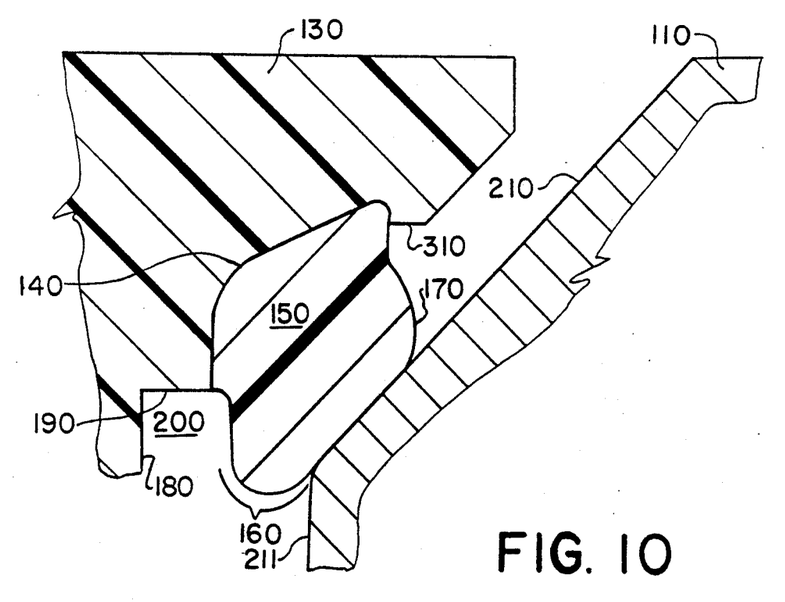
FIG. 10 is a partial cross-section view of the plug and sealing member in a "sealed" position and exposed to high temperature.

At relatively low pressures, the effect of temperature swelling is an extension of lower portion 160 over the inward edge of annular wall 210 as well as a slight bulging of sidewall 170, as shown in FIG. 10.

Figure 11:
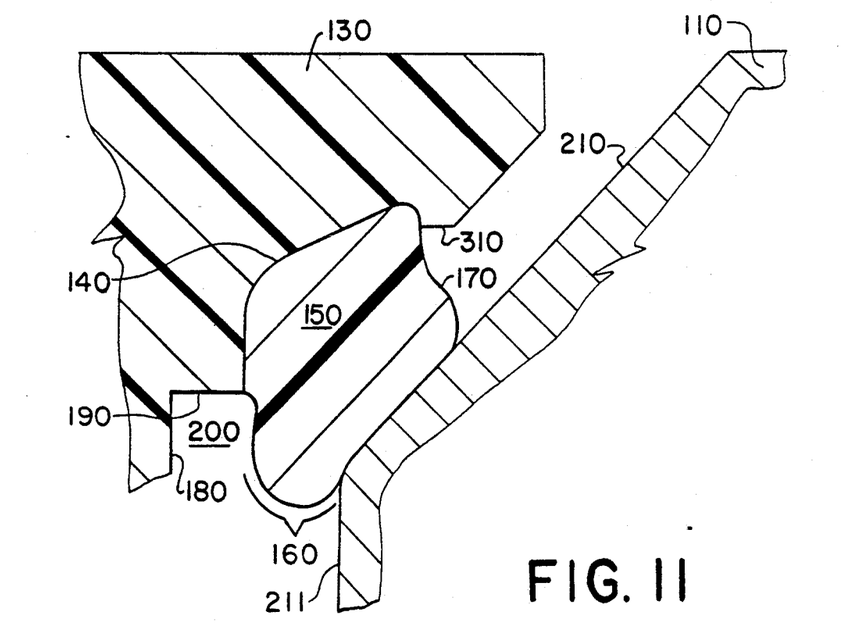
FIG. 11 is a partial cross-section view of the plug and sealing member in a "sealed" position and under low internal pressure and exposed to an aromatic fuel.

The effect of sealing member 150 being exposed to aromatic fuels is that lower portion 160 extends slightly more over the inward edge of annular wall 210 and that sidewall 170 bulges slightly onto annular wall 210, as illustrated in FIG. 11.

Figure 12:
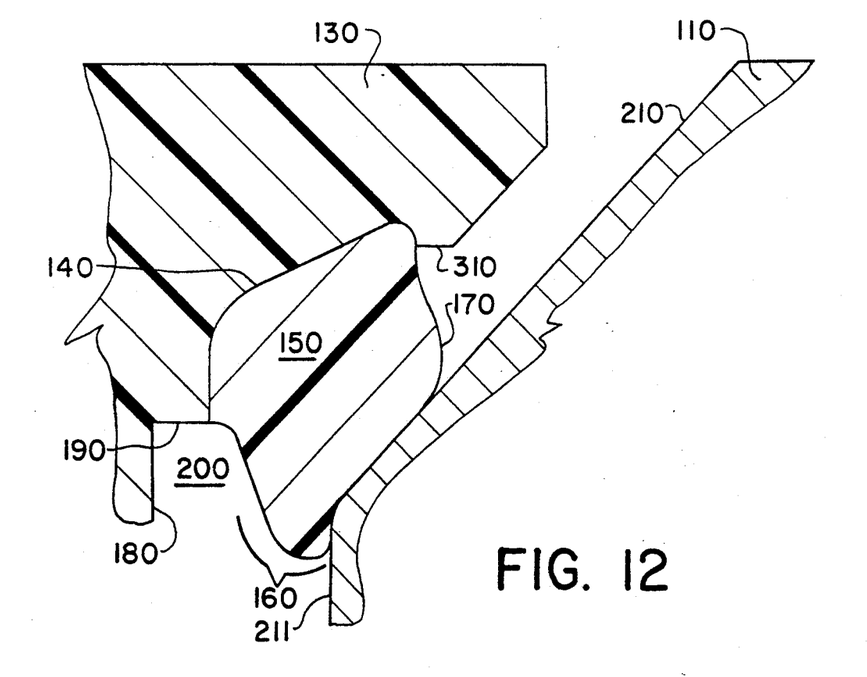
FIG. 12 is a partial cross-section view of the plug and sealing member in a "sealed" position and under high internal pressure and exposed to an aromatic fuel.
Figure 13:
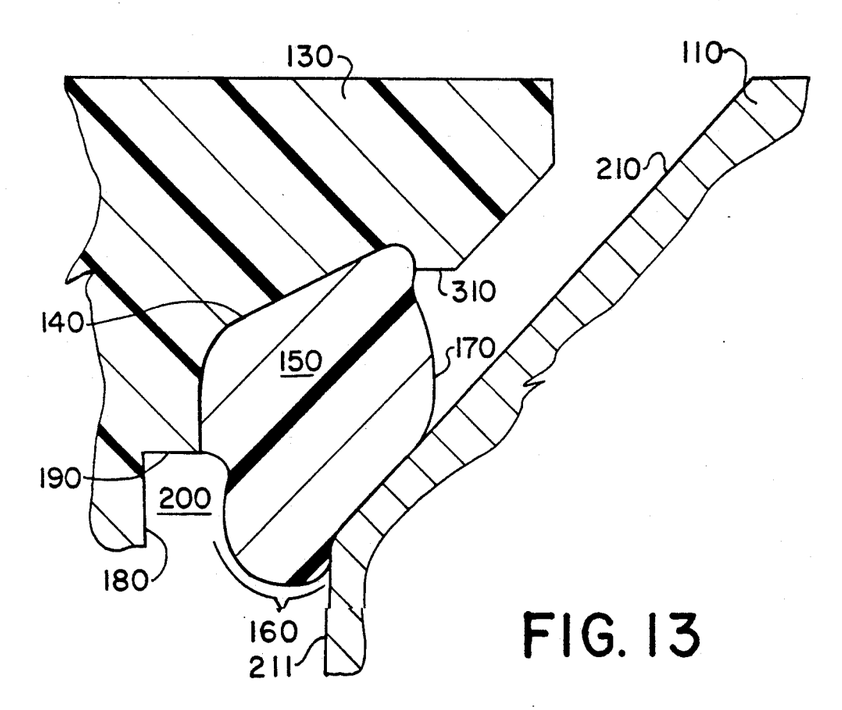
FIG. 13 is a partial cross-section view of the plug and sealing member in a "sealed" position and under high internal pressure and exposed to both high temperature and an aromatic fuel.

At high pressures and swelling due to aromatic fuels, the pressure displaces some material from the inward surface of lower portion 160 to tapered sidewall 170 so as to produce an enlarged and effective sealing surface area. With extreme aromatic swelling and either high pressure or high temperature, lower portion 160 may move into and along a vertical wall section 211 of adapter element 110, as illustrated in FIGS. 12 and 13, respectively. Without the present invention, this engagement may cause some problem on attempted removal of the fuel cap from adapter element 110 because swollen sealing member 15 would tend to stick or severely "lag" against vertical wall section 211, preventing it from sliding vertically upwardly. Advantageously, wit the present invention, however, sealing member 150 is constructed with sidewall 170 having a downward radially inward taper, preferably 8° from the vertical plane, which substantially obviates the problem.

With materials having a low volumetric swelling, the swelling induced by the simultaneous exposure of the sealing member to high temperatures and aromatic fuels is not sufficiently excessive to inhibit adequate pressure relief. Furthermore, at colder temperatures, fuel induced swelling may be appropriately counteracted by the cold temperature induced contraction. FIG. 6 shows in dashed lines the effects of cold temperature.

Plug member 120 is made from a non-conductive material to ensure that the fuel cap is safe from lightning and immune from electrical sparking. Such a requirement is necessary due to the highly combustible characteristic of aircraft fuels. Particularly, plug member 120 is made from a thermoplastic, such as either a polyether-imide resin containing a 20% glass reinforced resin or a polyamide-imide resin containing a 30% glass reinforced resin. The glass reinforced resin provides rigidity and stability that enable the fuel cap to withstand vibration encountered during normal use.

A suitable deformable material for sealing member 150 is fluorosilicone. Such a material when exposed to aromatic fuels has minimal volumetric swelling, typical less than 25%, as well as good pliant characteristics at temperatures near −65° F. Moreover, fluorosilicone readily bonds to either polyether-imide or polyamide-imide.

In one specific construction, plug member 120 is constructed of a polyether-imide resin containing 20% glass resin while sealing member 150 is constructed of fluorosilicone. Sidewall 170 is constructed to have downward radially inward taper of 8°. Pressure relief at three levels (5, 25 and 40 psi) are satisfactory. Particularly, for each pressure level, the desired pressure is trapped in the tank with the fuel cap locked. Lifting handle 270 releases the trapped pressure without damaging sealing member 150. Moreover, when the fuel cap is in the "sealed" position, sealing member 150 effectively seals to annular wall 210.

What is claimed is:

1. A fuel cap for a tank having an opening defined by a beveled annular wall, the fuel cap being movable vertically into said opening between a first sealed position with the cap locked against vertical removal from said opening and fully seated in said opening and a second release position with the cap locked against vertical removal from said opening at a level above said first position, said cap comprising:
    a) a plug member having a side portion adapted to be received vertically within the beveled annular wall of the opening, said side portion including a first peripheral groove having a sidewall defining a radially outwardly facing surface of said first groove;
    b) a deformable sealing member attached to the first groove and the sidewall thereof and having a lower portion extending vertically downwardly beyond said first groove for deformable engagement solely with the annular wall of the opening when said cap is in said first sealed position;
    c) a second peripheral groove disposed in the side portion of the plug member radially inwardly of and below the first peripheral groove;
    d) said second peripheral groove being in direct fluid communication with the interior of said tank and disposed in facing relation to the sealing member radially inwardly of its engagement with the annular wall of said opening to define a passage for internal pressure within the tank to act against the sealing member to urge it against the annular wall of the opening when the cap is in said first sealed position to increase the sealing engagement therewith;
    e) said second peripheral groove further accommodating deformation of the sealing member due to swelling thereof; and
    f) said sealing member being:
        i) attached to said first groove against removal therefrom by internal pressure within the tank when said cap is in said second release position, and
        ii) positioned with respect to said annular surface to provide release of said internal pressure along a path extending between said sealing member and said annular surface.

2. The fuel cap of claim 1 wherein the first peripheral groove is of concave cross-section and is bonded to the sealing member such that the bond is as strong as the material of the sealing member.

3. The fuel cap of claim 1 wherein the first peripheral groove is of concave cross-section extending upwardly from said second peripheral groove to a radially outward peripheral portion of said plug member for preventing expansion radially inward and limiting expansion radially outwardly thereby transforming swelling of said sealing member into a substantially linear downward swell.

4. The fuel cap of claim 1 wherein the sealing member has a lower portion with a semicircular downwardly extending surface facing and capable of being deformed against the annular wall of the opening when said cap is in said first sealed position.

5. The fuel cap of claim 4 wherein said sealing member includes an upper portion having a radially inwardly facing surface attached to the sidewall of said first groove and a radially outwardly facing surface extending downwardly and merging with the semicircular surface of the lower portion of the sealing member.

6. The fuel cap of claim 5 wherein the outwardly facing surface of the upper portion of the sealing member extends radially inwardly at an angle $\theta$ from the vertical.

7. The fuel cap of claim 6 wherein the angle $\theta$ is approximately 8 degrees.

8. The fuel cap of claim 2 wherein the second peripheral groove has a reduced cross section compared to the first peripheral groove and includes a substantially horizontal surface facing downwardly toward the interior of the tank and a substantially radially outwardly facing vertical surface.

9. The fuel cap of claim 8 wherein the lower portion of the sealing member extends below the substantially horizontal surface of the second groove.

10. The fuel cap of claim 1 wherein the sealing member is constructed of resilient deformable material which deforms when positively engage against the annular wall of the opening and which substantially recovers its shape when not engaged with the annular wall.

11. The fuel cap of claim 10 wherein the sealing member is made of an elastomer material having a volumetric swelling which exerts an associated force against the plug member when engaged against the annular wall of said opening which is less than a force which would cause fracturing of the plug member.

12. The fuel cap of claim 11 wherein:
a) the plug member is constructed of plastic material; and
b) the sealing member is integrally molded to the sidewall of said first peripheral groove of said plug member so that the fuel cap can relieve tank pressures at least as high as 40 psi without being forced out of said first groove.

13. The fuel cap of claim 12 wherein the elastomer material is fluorosilicone.

14. The fuel cap of claim 13 wherein the plug member is comprised of a non-conductive thermoplastic material.

15. The fuel cap of claim 14 wherein the plug member is made of one of the group of polyetherimide and polyamide-imide resins.

16. The fuel cap of any one of claims 1, 6, 11, 12 and 15 wherein the sealing member is of a size whereby it is spaced from the annular wall of said opening when the cap is in said second release position to provide an open passage between the sealing member and said annular wall.

17. The fuel cap of claim 16 wherein:
a) the sealing member is of material which swells volumetrically when exposed to aromatic fuel; and
b) the spacing between the sealing member and the annular wall of said opening, when said cap is in said second release position, is sufficient to accommodate swelling of said sealing member and still leave an open passage between the sealing member and the annular wall of said opening.

18. The cap according to claim 17 wherein:
a) the beveled annular wall surface of the opening in the tank merges at its radial inner extent into a vertical wall surface; and
b) the sealing member engages the beveled annular wall surface immediately adjacent the vertical wall surface when said cap is in said second sealed position.

* * * * *